No. 682,244. Patented Sept. 10, 1901.
C. R. DAVIS.
DISK PLOW.
(Application filed Apr. 29, 1901.)
(No Model.) 3 Sheets—Sheet 1.
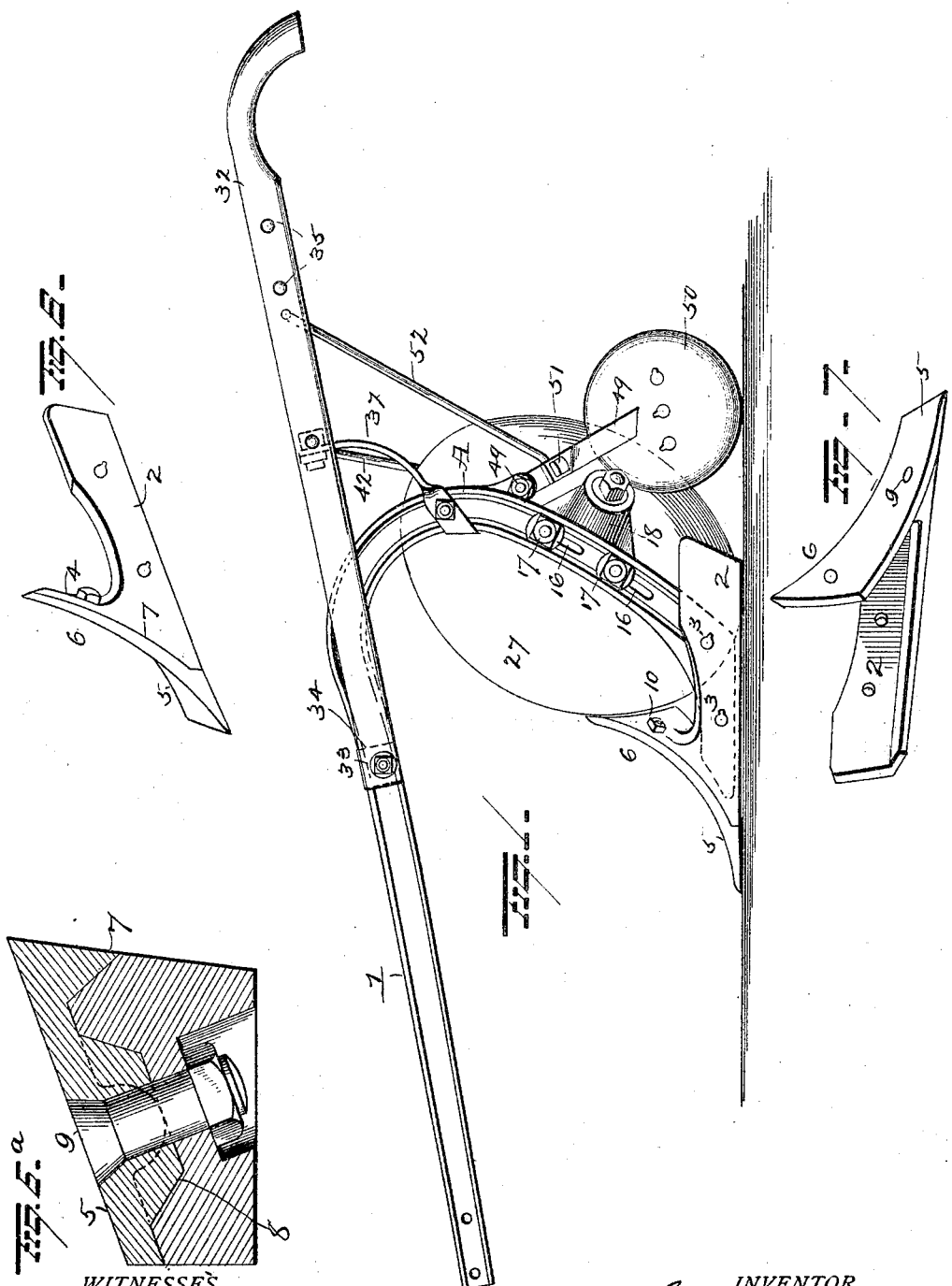
WITNESSES
INVENTOR
C. R. Davis
By H. A. Seymour
Attorney No. 682,244. Patented Sept. 10, 1901.
C. R. DAVIS.
DISK PLOW.
(Application filed Apr. 29, 1901.)
(No Model.) 3 Sheets—Sheet 2.
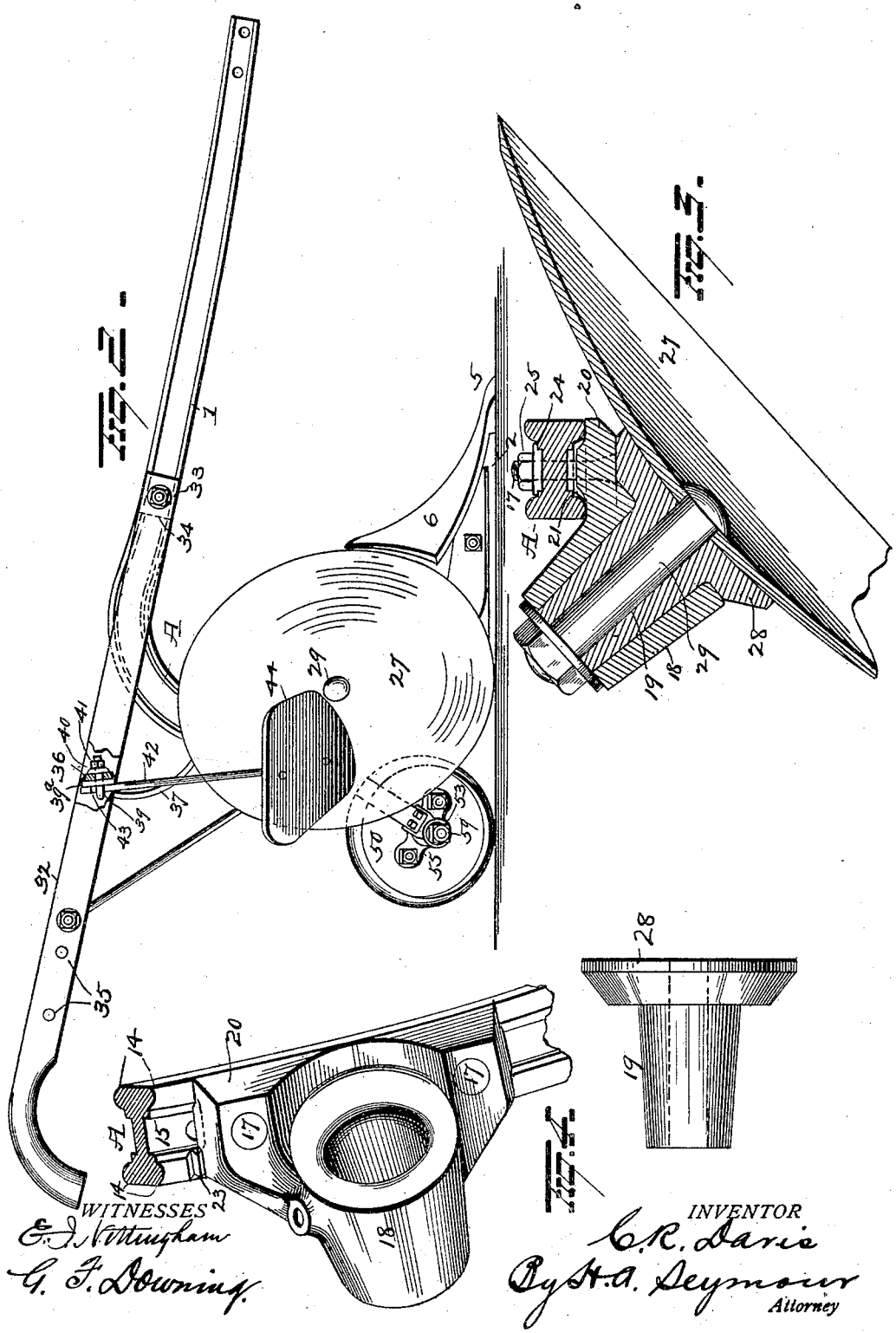
WITNESSES
INVENTOR
C. R. Davis
By H. A. Seymour
Attorney

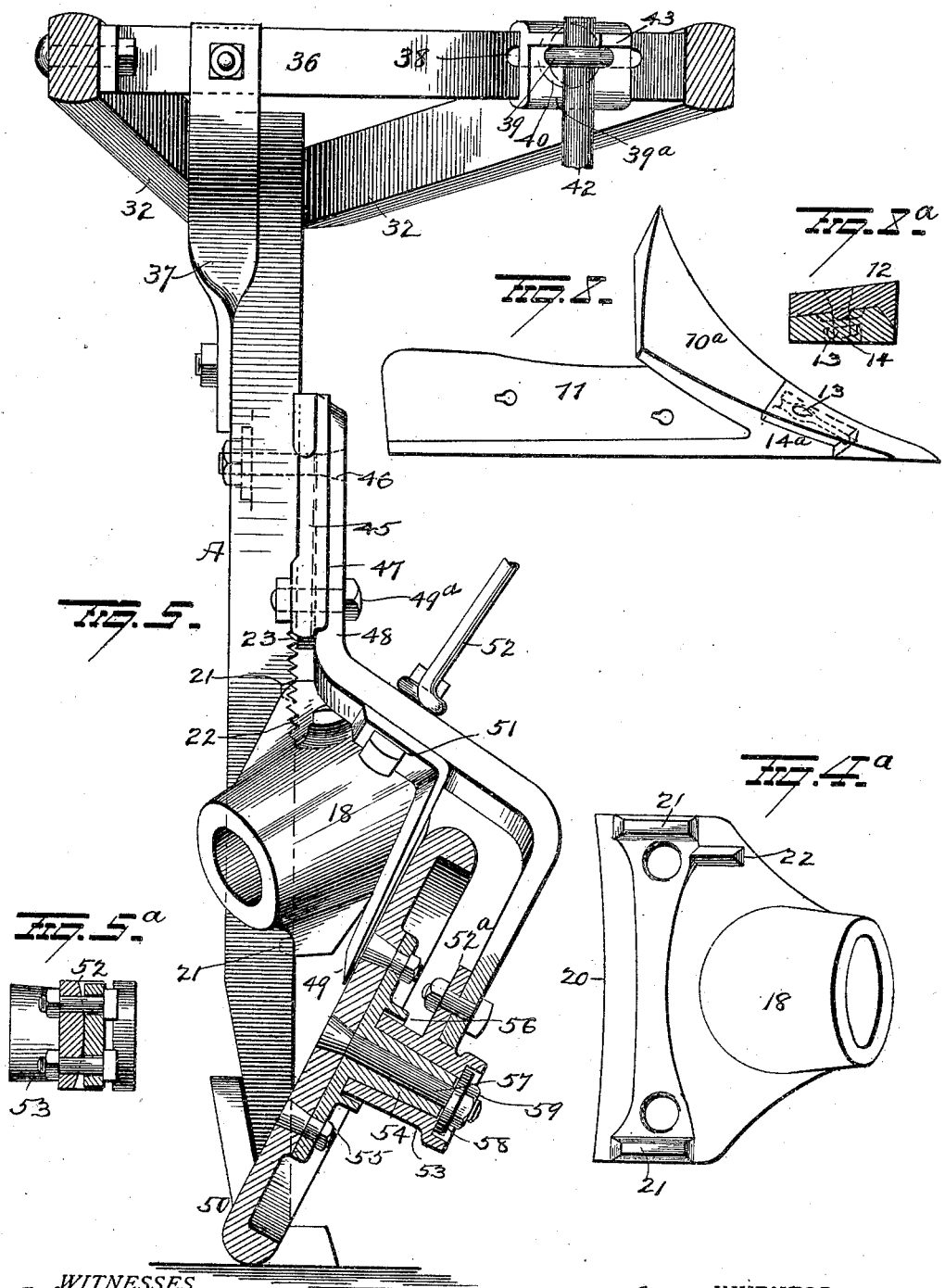

UNITED STATES PATENT OFFICE.

CALVIN R. DAVIS, OF SOUTH BEND, INDIANA, ASSIGNOR TO SOUTH BEND IRON WORKS, OF SAME PLACE.

DISK PLOW.

SPECIFICATION forming part of Letters Patent No. 682,244, dated September 10, 1901.

Application filed April 29, 1901. Serial No. 58,020. (No model.)

*To all whom it may concern:*

Be it known that I, CALVIN R. DAVIS, of South Bend, in the county of St. Joseph and State of Indiana, have invented certain new and useful Improvements in Disk Plows; and I do hereby declare the following to be a full, clear, and exact description of the invention, such as will enable others skilled in the art to which it appertains to make and use the same.
My invention relates to an improvement in disk plows, the object of the invention being to so connect the disk and standard that the disk can be adjusted to a fine degree to insure its proper working and compensate for wear thereof.

A further object is to provide an improved bearing for the disk which will prevent lateral displacement thereof, but which will permit the ready removal of the disk when desired.

A further object is to provide an improved point and shin-plate and so mount the latter in relation to the disk as to prevent any possibility of trash collecting between them to interfere with the perfect operation of the plow.

A further object is to provide the plow with an improved guide-wheel, which will cause the plow to run steady and prevent its vibrating.

With these objects in view the invention consists in certain novel features of construction and combinations and arrangements of parts, as will be more fully hereinafter described, and pointed out in the claims.

In the accompanying drawings, Figures 1 and 2 are views in elevation of opposite sides of the plow. Fig. 3 is a view in section through the disk bearing. Fig. 4 is a detached view of the disk spindle-box. Fig. 5 is a view illustrating the guide-wheel. Figs. 6 and 7 are detail views of the landside, point, and shin-plate; and Fig. 8 is a modified form of landside, point, and shin-plate. Figs. $4^a$, $5^a$, $6^a$, and $8^a$ are views of details.

1 represents a metal beam curved downward at its rear end, forming the standard A, and then extends forward in the form of an elongated foot contracted for the attachment of the landside 2 and is made long to reinforce the same, the foot and landside being provided with alined holes for bolts 3 to secure them rigidly together. The landside 2 is provided at its forward end with a rearwardly and upwardly projecting plate 4, which latter is practically horizontal at its forward end and gradually twists or inclines until at its rear end it is disposed at an angle of about thirty degrees. To this plate 4 the point 5 and shin-plate 6 (which are made integral and of chilled or hardened metal) are secured. The point 5 is held against the end of the landside 2 by the shin-plate 6, and the latter is made on its upper side edge with a flange 7 to fit against the edge of plate 4 and is provided centrally on its under face with a rib 8 to fit into a correspondingly-shaped depression in the plate 4 and prevent any possibility of lateral displacement of the point and shin-plate, and said rib is enlarged centrally and made with a hole alining with a hole in the landside for the reception of a bolt 9, which, together with a bolt 10, secured in alined holes in the upper end of the shin-plate 6 and plate 4, firmly secures the point and shin-plate in place, but which will permit of their ready removal when it is desired to replace them with new ones. Instead of making the landside, shin-plate, and point as above described I might construct the same as shown in Fig. 8. In this form of my invention I dispense with the plate 4 and make the shin-plate $10^a$ integral with the landside 11 and recess the latter at its forward end to seat the upper end of the point 12, the main portion thereof being held against the forward end of the landside by a bolt 13 passing through the point and landside, and the latter is made with a recess or depression to receive a rib $14^a$ on the point and prevent lateral movement of the same. The standard A and beam 1 are made on their opposite faces with flanges 14 at each edge and with a central depression 15, and the standard A is made with elongated slots 16 in the central depressed portion thereof for the reception of bolts 17 to secure the disk spindle-box 18 to the standard. The box 18 is conical in general contour and made with a conical bore to receive the disk-spindle 19 and is provided on one side with an integral bar or plate 20, projecting at an angle of about forty-five degrees to the axis of the box 18 and projecting at each end beyond the box. The bar or plate 20 is provided on its rear face at or near each end with transverse lugs 21 to fit into the standard between the flanges 14 and insure a rigid bearing, and is provided beside one of said lugs 21, preferably the upper one, with a tooth 22 to fit into any one of a series of notches or serrations 23 on the standard and be held therein by the bolts 17. The bolts 17 are passed through holes in the ends of bar or plate 20 and slots 16 in standard A and provided on their threaded ends with angular washers 24 to fit between the flanges 14 of the standard and are secured in place by nuts 25, the bar or plate 20 being of sufficient width to be held flat against the standard without bringing the box 18 against or in contact therewith, the sole support of the box being the bar or plate 20, which is firmly held against the standard, as above explained, to dispose the box at a proper angle to receive the spindle 19 and to properly support the disk 27. It will thus be seen that I am enabled to move the box 18 and secure it at the finest adjustment, as the slots 16 will permit the bolts 17 to be moved therein when the nuts 25 are loosened, and the spindle-box 18 can be moved a distance of one notch or more and then rigidly secured in place with no danger of the box slipping should the nuts become slightly loosened during the operation of the plow. The outer or forward side of the bar or plate 20 is made with a curved recess to receive the circular and beveled enlarged head 28 on the spindle 19 and permit the latter to freely revolve, said head 28 being concave on its outer face to permit the disk to lie flat thereagainst and insure to it a large and firm bearing. The spindle 19 is provided with a central hole for the bolt 29, which is passed through a central hole in the disk 27 and secured in the spindle by a nut 30, screwed onto the rear end of the bolt and against the end of the box 18 to hold the disk on the spindle and the latter in the box. The inner end of the shin-plate 6 is supported in close proximity to the periphery or edge of the disk, as clearly shown in Fig. 1, the upper end being extremely close to the disk, and the edge of the disk gradually retreats from the edge of the shin-plate from the upper to the lower end thereof, where it is spaced the greatest distance therefrom, so as to permit any trash which may be caught by the disk to escape past the shin-plate and not retard the movement of the disk and interfere with the perfect operation of the plow. The handles 32 are secured to the beam 1 by a bolt 33, passed through alined holes in the handles, beam, and wedge-shaped blocks 34 to hold the handles in proper position relative to each other, and a nut is screwed onto the end of the bolt 33 to secure all of said parts in place. Wooden braces 35 are located between the handles and secured thereto at their respective ends, and a metal brace 36 is disposed between the handles near the beam 1 and secured at its respective ends to the handles by bolts, as shown. The brace 36 is connected by a twisted bar 37 with the standard A, bolts being employed to secure the bar to the brace and standard. The brace 36 is provided near one end with an elongated slot 38 for the reception of an eyebolt 39, which latter is first passed through a block or clip $39^a$, having flanges at its upper and lower edges to fit over the edges of the brace, and a washer 40 is interposed between a nut 41 on the threaded end of the bolt and brace. The block $39^a$ is made with a beveled opening large enough to permit the eye of the bolt to be drawn therein by the nut 41 far enough to clamp a rod 42 securely against a notched flange 43 on the block $39^a$. The rod 42 has secured on its lower end a scraper 44, which is made concave on its front face and the scraping edge is sharp and curved, giving it a shearing cut when removing the soil from the disk, and being concave on its front face it also assists the disk in turning the soil and throws the top edge of the furrow forward in advance of the rest of the furrow, thereby covering up all trash and vegetation. A casting 45 is secured on the standard A above the disk-spindle box by means of a bolt 46 and is made with grooves and ribs on one side to receive the flange 14 on the standard and prevent movement of the casting when secured in place by the bolt. The other or outer face of the casting 45 is made with parallel flanges 47, between which a rod or wheel standard 48 is secured by means of a bolt $49^a$, together with the bolt 46, above referred to, and said casting is enlarged between the bolt-holes to permit the relative angle of the standard 48 to be changed by simply loosening one bolt and tightening up the other, the enlarged central portion of the casing between the bolt-holes serving as a fulcrum on which the standard moves. The standard 48 is bent, as shown, and has secured thereto a scraper 49 (for the guide-wheel 50) by a bolt 51, which latter also serves to secure one end of a brace-rod 52 to the standard 48, the other end of said rod 52 being bent and passed through a hole in one handle 32 and screw-threaded on its end for the reception of a nut to secure the brace in position. The lower end of the standard 48 is widened and made near each side edge with a hole alining with holes in a tongue $52^a$, integral with and projecting at right angles to a spindle-box 53, which is made with a slightly-conical bore to receive a similarly-shaped spindle 54, integral with a plate 55, secured to the guide-wheel 50 by bolts, as shown, and said plate is made with a circular flange 56 to inclose the end of the box 53 and prevent the entrance of dirt and grit therein. Said spindle 54 is made with a central hole for the reception of a bolt 57, on which latter a washer 58 is located and secured in the enlarged and flanged end of the box by a nut 59 to secure the spindle therein. The tongue 52ª is made thickest at its center between the bolt-holes and slopes or inclines to its edges to permit the relative angle of the tongue and box 53 to be changed by simply loosening one bolt and tightening the other, as the central or widest portion of the tongue will serve as a fulcrum on which the tongue is turned to change the angle of the guide-wheel, as will be readily understood. This guide-wheel 50 runs in the corner of the furrow and lessens the friction of the soil on the landside-shoe, also causing the plow to run steady. The guide-wheel is made with an oval face or, in other words, a rounded periphery, which sinks a short way into the soil, forming a hold for the wheel and preventing the plow vibrating to either side, thus insuring a straight and even furrow. Besides it is found by practice that the oval-faced rim sheds the soil more readily than other forms of face. It is important that the relative angle of the wheel-standard to the plow-standard and the guide-wheel to the wheel-standard can be adjusted, for the plow has a tendency in some soils to work away from the wall of the furrow and the wheel can by the means above described be set at the proper angle to cause the plow to run true. The plow-standard A inclines forward from its upper to its lower end just enough so that when a portion of the disk is worn off and it becomes necessary to lower the disk it is moved forward at the same time it is lowered, thus always maintaining the disk close to the shin-plate, which is, in effect, a part of the landside terminating in front of the disk, the rear portion of which may be termed a section of moldboard which conforms to the face of the rotary moldboard or disk, but is somewhat higher on its face than the face of the disk. This is required on account of the shin-plate wearing much faster than the face of the disk, and which makes it sure to carry all the soil onto the disk. When the point becomes dull and worn and is to be replaced by a new one, the operator has the benefit of an entirely new cutting edge the full length of the point, while with the plows and landside in one piece the operator was compelled to throw away the landside before worn out on account of the point being dull or badly worn. In this invention that part of the shin-plate which extends above the landside is curved in to meet the edge of the disk and is exactly the shape to cut what soil the disk will turn and no more and also leaves the wall-furrow in good shape to be turned the next time around. The plow-point assists in keeping the plow in the ground and making it run steady. The point is just wide enough to cut out the ridge which would otherwise remain in the furrow. The shin-plate at its top or inner edge lies close to the disk, while the space between the lower edge and the disk is greater, so that in case trash be carried between the point and the disk it will readily pass and will not stop the rotation of the disk, as is a common fault with plows of this character heretofore known.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a plow, the combination with a standard having a series of notches therein and a landside, of a moldboard-support having a tooth thereon to engage said notched portion of the standard, means for holding the tooth in a notch and a revoluble moldboard mounted on said support.

2. In a plow, the combination with a standard having a series of notches therein, of a spindle-box having a tooth thereon to fit into any one of the notches in the standard, bolts passed through said box and slots in the standard to hold the tooth in a notch, and a moldboard having a journal mounted in said journal-box.

3. In a plow, the combination with a standard having elongated slots therein and a series of notches, of a revoluble moldboard, a spindle-box for the journal of the moldboard, a bar on said spindle-box adapted to fit against the standard and having bolt-holes therein, a tooth on said bar to engage the notched portion of the standard, and bolts passed through said bolt-holes in the bar and the slots in the standard to clamp the tooth in a notch and to permit of the adjustment of the tooth from one notch to another.

4. In a plow, the combination with a standard inclining forward from its upper to its lower end, a forwardly-projecting foot on the lower end of said standard, a landside secured to the foot and a shin-plate secured to the landside, of a rotary moldboard or disk adjustably and revolubly connected to the standard and having its edge disposed close to the upper edge of the shin-plate and retreating therefrom to the lower edge of the shin-plate where a considerable space is left between the edge of the moldboard and shin-plate to permit the escape of trash.

5. In a plow, the combination with a standard, a rotary moldboard or disk revolubly connected to the standard between its ends and a landside connected to the lower end of the standard, of a plow-point and a shin-plate secured to said landside, the rear edge of the shin-plate at its upper end disposed close to the edge of the moldboard or disk and said rear edge of the shin-plate then gradually sloping away from the edge of the disk.

6. The combination of a standard, a landside secured thereto, a moldboard mounted on the standard, a plow-point having bearing against the landside, a rib on the face of the part of the point which lies against the landside, said rib fitting into a depression in the landside and a bolt passing through the landside, point and the rib on the latter.

7. The combination with a landside and an inclined rearwardly-projecting plate integral therewith, of a combined plow-point and shin-plate having a rib on its under face to fit into a depression in the first-mentioned plate, and a bolt securing said parts together and a moldboard in rear of the rear edge of said shin-plate.

8. A bearing for a rotary concavo-convex moldboard or disk, comprising a spindle-box having a conical bore, a bar integral with said box and projecting at an angle thereto and adapted to support the box, a hollow spindle in said box, an enlarged head at the forward end of the spindle having a concave face to receive the convex rear face of the disk, a headed bolt passed through said disk and spindle and a nut screwed onto said bolt and against the rear end of the box.

In testimony whereof I have signed this specification in the presence of two subscribing witnesses.

CALVIN R. DAVIS.

Witnesses:
EDWIN NICAR,
H. GAIL DAVIS.